United States Patent [19]
Spinu

[11] Patent Number: 5,202,413
[45] Date of Patent: Apr. 13, 1993

[54] ALTERNATING (ABA)N POLYLACTIDE BLOCK COPOLYMERS

[75] Inventor: Maria Spinu, Wilmington, Del.

[73] Assignee: E. I. Du Pont de Nemours and Company, Wilmington, Del.

[21] Appl. No.: 816,201

[22] Filed: Dec. 31, 1991

[51] Int. Cl.$^5$ ............................................. C08G 63/08
[52] U.S. Cl. ...................................... 528/354; 525/415; 528/26; 528/28; 528/76; 528/83; 528/300; 528/301; 528/341
[58] Field of Search ...................... 528/28, 26, 76, 83, 528/300, 301, 341, 354; 525/415

[56] References Cited

U.S. PATENT DOCUMENTS

| | | |
|---|---|---|
| 2,878,236 | 3/1959 | Young et al. |
| 3,169,945 | 2/1965 | Hostettler et al. |
| 4,328,322 | 5/1982 | Baroni ............................ 528/68 X |
| 4,699,974 | 10/1987 | Evans ................................ 528/354 |
| 4,950,735 | 8/1990 | Vanderbilt et al. ................ 528/354 |
| 5,028,667 | 7/1991 | McLain et al. ..................... 525/415 |

FOREIGN PATENT DOCUMENTS

| | | |
|---|---|---|
| 5060290 | 1/1990 | Australia . |
| 3911557 | 8/1989 | Fed. Rep. of Germany . |
| 59-27923 | 2/1984 | Japan . |

OTHER PUBLICATIONS

Barskaya et al., "Polymer Science USSR," (translated from) vol. 25, No. 7, pp. 1788–1793 (1983).
Feng et al., "J. Polym. Sci: Letters Ed." vol. 21 pp. 593–600 (1983).
Song et al., "Macromolecules" vol. 17 pp. 2764–2767 (1984).
Grijpma et al., "Polymer Bulletin" vol. 25 pp. 327–333 (1991).
Hamitou et al., "J. Polym. Sci: Pol. Chem. Ed." vol. 15, pp. 1035–1041 (1977).
K. J. Ivin, T. Saegusa, "Ring Opening Polymerization" vol. 1, Ch. 7 pp. 461–521 (1984).

*Primary Examiner*—Nathan M. Nutter
*Assistant Examiner*—Shelley Wright
*Attorney, Agent, or Firm*—Robert B. Stevenson

[57] ABSTRACT

Polymers of the general formula R—(A-B-A-I)-$_x$A-B-A-R and their preparation are disclosed. In the general formula, -A- is a polyhydroxy acid residue preferably a polymer of either 98 to 100% L-lactide or 98 to 100% D-lactide having a molecular weight of 500 to 40,000 and preferably 2,000 to 20,000, -B- is an oligomeric diol or diamine residue, having a number average molecular weight of 500 to 20,000 and preferably 2,000 to 8,000. The polymers are prepared by polymerizing a lactone onto the diol or diamine followed by reacting the resulting polymeric H-A-B-A-H with an diisocyanate or diacyl chloride to form the -L- chain extending units in the general formula.

25 Claims, No Drawings

ALTERNATING (ABA)N POLYLACTIDE BLOCK COPOLYMERS

BACKGROUND OF THE INVENTION

1. Field of the Invention:

The present invention relates to biodegradable multiblock copolymers. More specifically, the invention relates to multiblock copolymers involving sequentially ordered blocks of polylactide and/or polyglycolide produced by ring-opening polymerization of lactide and/or glycolide onto either an oligomeric diol or diamine residue followed by chain extension with a difunctional compound.

2. Description of the Related Art:

Ring opening polymerization of lactones and their initiation by active hydrogen compounds to generate difunctional polymers is reported by K. J. Ivin, and T. Saegusa, *Ring Opening Polymerization*, Vol 1, Ch. 7 (1984), pp 461–521.

Preparation of block copolymers in which at least one block is a polylactone has been achieved either by simultaneous or sequential polymerization. For example, D. W. Grijpma, G. J. Zondervan, and A. J. Pennings, *Polymer Bul.*, Vol 25 (1991), pp 327–333 prepared random block copolymers of e-caprolactone and lactide by simultaneous polymerization. The different reactivity ratio of the two monomers leads to a block copolymer with random block distribution. A. Hamitou, R. Jerome, and P. Teyssie, *J. Polym. Sci.: Pol. Chem. Ed.*, Vol 15 (1977), pp 1035–1401 used bimetallic u-oxoalkoxides to prepare AB copolymers of e-caprolactone and -propiolactone by sequential monomer addition. X. D. Feng, C. X. Song, and W. Y. Chen, *J. Polym. Sci.: Pol. Letters Ed.*, Vol 21 (1983), pp 593–600 reported the preparation of AB block copolymers of e-caprolactone and lactide using the same procedure.

Preparation of ABA copolymers through living polymerization is more difficult and requires modification of the growing AB intermediate. C. X. Song, and X. D. Feng, *Macromolecules*, Vol 17 (1984), pp 2764–2767 prepared ABA trtiblock copolymers of e-caprolactone-lactide-e-caprolactone by converting the PCL-PLA-OAl to PCL-PLA-(OCH$_2$CH$_2$)$_{2-4}$-OAl species which can reinitiate caprolactone polymerization for the third block.

Australian Published Patent Application No. 50602/90 discloses poly(ester-silicone) block copolymers wherein a hydroxyl terminated poly(organosiloxane) oligomer and a hydroxyl terminated polyester comprised of lactide and glycolide units are randomly linked by a diisocyanate compound, resulting in a random sequence of polyester blocks and poly(organosiloxane) blocks along the copolymer chain.

German Offenlegungsschrift DE391157 A1 discloses block copolymers wherein one type block is formed from an aliphatic polycarbonate, and the other type block is a polylactone, or a copolymer of a lactone and a carbonate.

Japanese Application No. 59-27923 discloses poly(ether-ester) block copolymers. These copolymers are produced in a manner similar to the Australian Published Patent application cited above by reacting hydroxy terminated polyethers and hydroxy terminated polyesters with a bis-acyl-lactone linker, to produce a random block distribution.

Barbskaya et al. in "Role of Hydroxyl-Containing Compounds in Processes of Cationic Polymerization of dl-Lactide", translation from Polymer Science U.S.S.R., Vol 25, No 1, pp. 1788–1793 (1983) describe the effect of octyl alcohol, glycolic acid and water on cationic polymerization of dl-Lactide, in the melt using SnCl$_2$.2H$_2$O catalyst.

In U.S. Pat. Nos. 2,878,236 and 3,169,945, lactone polyesters are described wherein the lactone starting material is identified as having at least six carbon atoms to avoid a tendency for the resulting polymer to revert to the monomer.

SUMMARY OF THE INVENTION

The present invention provides a process for the preparation of perfectly altering block copolymers (ABA)$_n$ in which A block is a biodegradable polylactide, polyglycolide or substituted polyglycolide. The process comprises: polymerizing cyclic diesters from hydroxy or amino groups of a preformed B block (see equation 1 below), followed by reacting the dihydroxy ABA blocks with a difunctional linker (diisocyanates, diacyclchlorides, dichlorosilanes) to repeat the ABA structure along the copolymer chain (see equation 2):

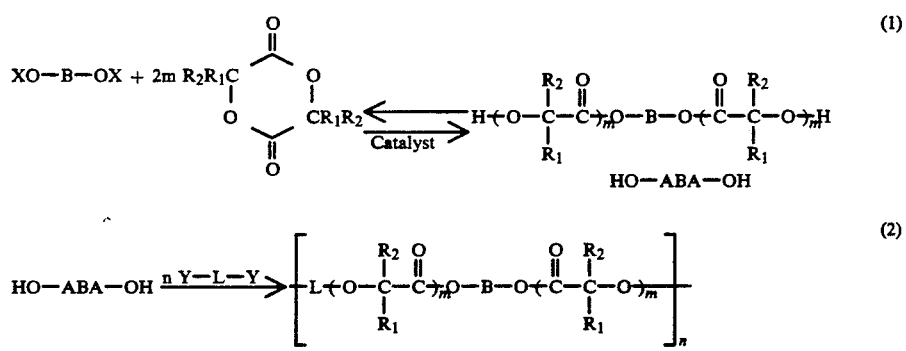

The role of the difunctional linker Y-L-Y is simply to provide an increase in copolymer molecular weight. The physical, mechanical and thermal behavior of the perfectly alternating copolymers will be controlled by: (a) nature of B block, (b) copolymer chemical composition, and (c) crystallinity of A and B blocks. When the starting cyclic diester is a chiral material, the semicrystalline A blocks can provide the same function (physical crosslinking) as urethane hard segments in polyurethane segmented copolymers.

Thus the present invention further provides block copolymers of the formula R$+$A—B—A—L$)_x$A—B—A—R where -B- is an oligomeric diol residue or an oligomeric diamine residue having a number average molecular weight of 500 to 20,000, -A- is a polyhydroxy acid block comprising either a polylactide, polyglycolide, or copolymer thereof having a number average molecular weight 500 to 40,000, x is 1 to 100, and -L- is the chain extender residue derived from an diacyl halide, diisocyanate, or the like containing 8 to 20 carbon atoms, and -R is hydrogen, chain extender residue or an end-capping group, wherein the resulting block copolymer has a number average molecular weight of greater than 10,000.

DESCRIPTION OF THE PREFERRED EMBODIMENTS

The present invention provides a method for the preparation of R—A—B—A—$_x$A—B—A—R polymers in which x is 1 to 100, and the -A-s are biodegradable polyhydroxyacid blocks. The type -B- block can be widely varied and virtually any difunctional oligomer having two hydroxyl or primary amino end groups can be used. The invention contemplates forming multiblock copolymers with uniformly alternating triblocks of different chemical compositions which can cover the whole range of properties from hard (glassy) plastics, to soft (toughened) plastics to elastomers for a wide range of applications.

The -B- block can be widely varied. Generally the -B- blocks have a number average molecular weight of from 500 to 20,000 with 2,000 to 8,000 being the preferred range. The starting material, from which the -B- is derived, is characterized by the formula H-B-H where each -H is part of a terminal —NH$_2$ or —OH group. Thus the -B- can be a derived from a dihydroxyterminated polyether (i.e., a telechelic polyether) with repeating units of the structure —R$^1$—O—, where —R$^1$— is —CH$_2$—$_z$ where z is 2 to 6 or mixtures thereof. The -B- can also be derived from a dihydroxyterminated polyester (i.e., a telechelic polyester) having repeating units of the structure:

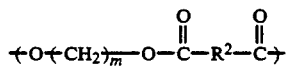

where m is 2 to 6 and -R$^2$- is a divalent aliphatic, cycloaliphatic or aromatic group having 2 to 20 carbon atoms. The -B- can be formed from dihydroxy terminated (telechelic) polyesters having repeating units of the structure

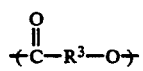

where -R$^3$- is a divalent aliphatic, cycloaliphatic or aromatic group having 6 to 20 carbon atoms. The -B- can also have the structure:

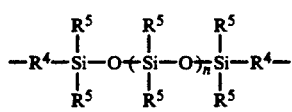

where the -R$^4$s are alkylene groups containing 3 to 10 carbon atoms, with a terminal amino or hydroxy function, the -R$^5$s are independently selected from the group consisting of hydrogen, saturated or unsaturated aliphatic radicals containing 1 to 20 carbon atoms (preferably 1 to 6 carbon atoms), aromatic radicals containing 6 to 20 carbon atoms, and perfluoroalkyl radicals containing 1 to 20 carbon atoms (preferably 1 to 6 carbon atoms) and n is 15 to 150. Most preferably, the -R$^5$s are C$_1$ to C$_6$ alkyl, phenyl, vinyl, or 3,3,3-trifluoropropyl radicals.

The -A- blocks are formed by ring opening polymerization of simple lactones with the general formula:

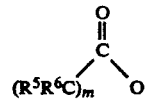

where R$^5$ and R$^6$ are the same or different and are hydrogens, aliphatic groups of 1 to 10 carbon atoms or aromatic groups of 6 to 12 carbon atoms, and m is 2 to 10.

Diester lactones useful in the present invention have the general formula:

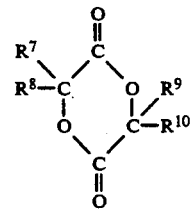

where -R$^7$, -R$^8$, -R$^9$, and -R$^{10}$ are the same or different and are hydrogen, an aliphatic group of 1 to 10 carbon atoms or an aromatic group of 6 to 12 carbon atoms.

In a preferred aspect of the invention, the -A- blocks are polylactide wherein 98 to 100% of the lactide used to form the polylactide is one of either D-lactide or L-lactide, to provide a significant degree of crystallinity within the -A- block. The individual -A- blocks generally have a number average molecular weight of 500 to 40,000 with 2,000 to 20,000 being the preferred range. Thus, generally from 99 to 5 wt. % of the polymer (ignoring the chain extension and end-capping contributions) will be -A- blocks and 1 to 95 wt. % -B- blocks with from 99 to 50 wt. % -A- blocks and 1 to 50 wt. % -B- blocks being the preferred range. The polymer is prepared by polymerizing the L-lactide or D-lactide onto a preformed -B- block to form what is in principle the intermediate H-A-B-A-H copolymer block. It should be appreciated that this intermediate corresponds literally to the "HO-ABA-OH" reactant of equation (2) above in that -A- polyhydroxy acid block involves the acly group of lactide being bonded to the growing polymer thus leaving a terminal oxygen available for further chain growth, chain extension and/or chain termination. The -A- blocks are formed by ROP (ring opening polymerization) of lactone using ionic or nonionic catalysts as described in "Ring Opening Polymerization", Vol. 1, page 461–521, K. J. Ivin and T. Saegusa (1984). The catalyst include coordination catalysts such as stannous 2-ethylhexanoate (tin octanoate), or a yttrium or lanthanide series rare earth metal based catalyst (coordination catalyst) such as described in U.S. Pat. No. 5,028,667. The polymerization is generally done at −100° to 200° C. with 10° to 180° C. being the preferred range. The polymerization may be done in solution or in the melt without a solvent. The final chain extended polymers of the present invention generally melt in the range of 80° to 170° C.

The H-A-B-A-H triblocks (the HO-ABA-OH of equation 2) are reacted with a chain extender to form a polymer of the formula R—A—B—A—L)$_x$A—B—A—R where -L- is the residue of the chain extending agent and the terminal -Rs are hydrogen radicals, (forming terminal —OH groups), the residue of the chain extending agent or optionally an end-capping group such as an acyl radical, —C(O)R' where R' is an alkyl group containing 1 to 10 carbon atoms or an aryl group containing 6 to 12 carbon atoms (forming terminal ester groups) or equivalent end-capping group as generally known in the art. Suitable chain extending agents are diisocyanates and diacyl chlorides containing 8 to 20 carbon atoms. The molar ratio of H-A-B-A-H (i.e., HO-ABA-OH), to chain extender should be about 1:1. The chain extending reaction can be done in bulk or in solution. Suitable temperatures for the chain extending reaction are 25° to 180° C. with from 100° to 150° C. being the preferred range. Suitable solvents for the lactide polymerization and chain extending reactions should be non-reactive organic liquids capable of dissolving at least 1 wt. % and preferably over 10 wt. % of chain extended polymers at 25° C. The product polymers generally have number average molecular weights of greater than 10,000 with 30,000 to 250,000 being the preferred range.

The polymers of the present invention are biodegradable and the toughened plastics find use as general purpose molding resins. The elastomeric products are useful in typical elastomeric applications such as rubber bands, seals, etc.

EXAMPLE 1

Synthesis of 90/10 wt. %
Polylactide/Poly(Butylene-Ethylene Adipate)

In a dry box, 22.5 g (156.2 mmoles) L-lactide and 2.5 g (0.735 mmoles) hydroxyl terminated poly(butylene-ethylene adipate), PBEA, with $M_n$ of 3,400 g/mole were weighed into an oven dried 100 ml. round bottom flask equipped with overhead stirrer, addition funnel and nitrogen inlet. The reaction flask was then transferred into the hood, placed under a dry nitrogen atmosphere, and heated in an oil bath to 120° C. The homogeneous melt was reacted for one hour at 120° C., in the absence of catalyst, to allow initiation of polymerization at the hydroxyl endgroups of the PBEA oligomer. After one hour, 0.8 ml stannous 2-ethylhexanoate, SnOct, solution (0.1M in toluene) was added (Monomer/Catalyst=2000/1 molar ratio), and the reaction was allowed to proceed for 2 more hours at 120° C. The reaction viscosity increased considerably after catalyst addition and 5-10 ml freshly distilled toluene were added (via syringe) to facilitate ease of stirring. A clear, viscous solution of A-B-A copolymer was formed at the end of the two hours. 5 Ml toluene and 0.11 ml (0.772 mmoles, 5% excess) toluene diisocyanate, TDI, were syringed into the addition funnel and the TDI solution was added to the reaction mixture drop-wise, over 30 minutes. During TDI addition, the reaction viscosity increased considerably and more toluene had to be added to maintain a homogeneous reaction mixture. The final reaction concentration was about 60% solids. At the end of TDI addition, the reaction mixture was cooled to room temperature, the polymer dissolved in 200 ml CH$_2$Cl$_2$, precipitated from hexane, and dried in a vacuum oven at room temperature for at least 24 hours.

Polymer properties

Weight average molecular weight ($M_w$)=98,200 as determined using gel permeation chromatography using a polystyrene standard (GPC, PS STD); melting temperature ($T_m$)=166° C. as determined using differential scanning calorimetry (DSC); glass transition temperature ($T_g$)=43° C. by calorimetry (DSC); Tensile Strength (TS)=8,100 psi; Initial Modulus (of elasticity in flex)=188,000 psi; Elongation at break=6%.

EXAMPLE 2

Synthesis of 75/25 wt. %
Polylactide/Poly(Butylene-Ethylene Adipate)

In a dry box, 18.0 g (125 mmoles) L-Lactide and 6.0 g (1.76 mmoles) hydroxyl terminated PBEA with $M_n$ of 3,400 g/mole were weighed into an oven dried 100 ml. round bottom flask equipped with overhead stirrer, addition funnel and nitrogen inlet. The reaction flask was then transferred into the hood, placed under a dry nitrogen atmosphere, and heated in an oil bath to 120° C. The homogeneous melt was reacted for one hour at 120° C., in the absence of catalyst, to allow initiation of polymerization at the hydroxyl endgroups of the PBEA oligomer. After one hour, 0.65 ml SnOct solution (0.1M in toluene) were added (M/Cat=2000/1 molar ratio), and the reaction was allowed to proceed for 2 more hours at 120° C. The reaction viscosity increased considerably after catalyst addition and 5-10 ml freshly distilled toluene were added (via syringe) to maintain the case of stirring. A clear, viscous solution of A-B-A copolymer was formed at the end of the two hours. 5 Ml toluene and 0.26 ml (1.848 mmoles, 5% excess) TDI were syringed into the addition funnel and the TDI solution was added to the reaction mixture drop-wise, over 30 minutes. During TDI addition, the reaction viscosity increased considerably and more toluene had to be added to maintain a homogeneous reaction mixture. The final reaction concentration was about 60% solids. At the end of TDI addition, the reaction mixture was cooled to room temperature, the polymer dissolved in 200 ml CH$_2$Cl$_2$, precipitated from hexane, and dried in a vacuum oven at room temperature for at least 24 hours.

Polymer properties $M_w$=161,000 (GPC, PS STD); $T_m$=151° C. (DSC); $T_g$=25° C. (DSC); TS=8,300 psi; Initial Modulus=34,000 psi; Elongation at break=630%.

EXAMPLE 3

Synthesis of 50/50 wt. %
Polylactide/Poly(Butylene-Ethylene Adipate)

In a dry box, 12.0 g (83.3 mmoles) L-Lactide and 12.0 g (3.53 mmoles) hydroxyl terminated PBEA with $M_n$ of 3,400 g/mole were weighed into an oven dried 100 ml. round bottom flask equipped with overhead stirrer, addition funnel and nitrogen inlet. The reaction flask was then transferred into the hood, placed under a dry nitrogen atmosphere, and heated in an oil bath to 120° C. The homogeneous melt was reacted for one hour at 120° C., in the absence of catalyst, to allow initiation of polymerization at the hydroxyl endgroups of PBEA oligomer. After one hour, the reaction temperature was increased to 150° C., 0.4 ml SnOct solution (0.1M in toluene) were added (M/Cat=2000/1 molar ratio), and the reaction was allowed to proceed for 2 more hours at 150° C. A viscous homogeneous melt was formed shortly after catalyst addition, and the viscosity increased with reaction time. 5 Ml toluene and 0.53 ml (3.706 mmoles, 5% excess) TDI were syringed into the addition funnel and the TDI solution was added to the reaction mixture drop-wise, over 30 minutes. During TDI addition, the reaction viscosity increased considerably but the reaction mixture stayed clear all the way through addition. At the end of TDI addition, the reaction mixture was cooled to room temperature, and dissolved in 200 ml CH$_2$Cl$_2$. The polymer was isolated by precipitation from hexane and dried in a vacuum oven at room temperature for at least 24 hours.

Polymer properties $M_w$=146,000 (GPC, PS STD); $T_m$=98° C. (DSC); $T_{g1}$ (PBEA)=30° C. (DSC); $T_{g2}$ (PLA)=52° C. (DSC); TS=7,400 psi; Initial Modulus=4,400 psi; Elongation at break=1,100%.

EXAMPLE 4

Synthesis of 80/20 wt. % Polylactide/Polytetramethylene Oxide

In a dry box 20.0 g (138.9 mmoles) L-Lactide and 5.0 g (1.724 mmoles) hydroxyl terminated polytetramethylene oxide (PTMO) with $M_n$ of 2,900 g/mole were weighed into an oven dried 100 ml. round bottom flask equipped with overhead stirrer, addition funnel and nitrogen inlet. The reaction flask was then transferred in the hood, placed under a dry nitrogen atmosphere, and heated in an oil bath to 120° C., using a programmable hot plate. The homogeneous melt was reacted for one hour at 120° C., in the absence of catalyst, to allow initiation of polymerization at the hydroxyl endgroups of PTMO oligomer. After one hour, the reaction temperature was increased to 150° C., 0.7 ml SnOct solution (0.1M in toluene) were added (M/Cat=2000/1 molar ratio), and the reaction was allowed to proceed for 2 more hours at 150° C. A viscous homogeneous melt was formed shortly after catalyst addition, and the viscosity increased with reaction time. 5 Ml toluene and 0.26 ml (1.810 mmoles, 5% excess) TDI were syringed into the addition funnel, and the TDI solution was added drop-wise into the reaction mixture, over 30 minutes. During TDI addition, the reaction viscosity increased considerably and a small amount of freshly distilled toluene was added to keep the reaction stirring. At the end of TDI addition, the reaction mixture was cooled to room temperature and dissolved in 200 ml CH$_2$Cl$_2$. The polymer was isolated by precipitation from hexane, and dried in a vacuum oven at room temperature for at least 24 hours.

Polymer properties $M_w$=85,000 (GPC, PS STD); $T_m$=152° C.(DSC); $T_g$=40° C. (DSC); TS=7,000 psi; Initial Modulus=115,000 psi; Elongation at break=710%.

EXAMPLE 5

Synthesis of 60/40 wt. % Polylactide/Polytetramethylene Oxide

In a dry box, 15.0 g (104.2 mmoles) L-Lactide and 10.0 g (3.448 mmoles) hydroxyl terminated PTMO with $M_n$ of 2,900 g/mole were weighed into an oven dried 100 ml round bottom flask equipped with overhead stirrer, addition funnel and nitrogen inlet. The reaction flask was then transferred in the hood, placed under a dry nitrogen atmosphere, and heated in an oil bath to 120° C. The homogenous melt was reacted for one hour at 120° C., in the absence of catalyst, to allow initiation of polymerization at the hydroxyl endgroups of PTMO oligomer. After one hour, the reaction temperature was increased to 150° C., 0.5 ml SnOct solution (0.1M in toluene) were added (M/Cat=2000/1 molar ratio), and the reaction was allowed to proceed for 2 more hours at 150° C. A viscous homogeneous melt was formed shortly after catalyst addition, and the viscosity increased with reaction time. 5 Ml toluene and 0.51 ml (3.621 mmoles, 5% excess) TDI were syringed into the addition funnel, and the TDI solution was added drop-wise into the reaction mixture, over 30 minutes. During TDI addition, the reaction viscosity increased considerably but stayed clear all the way through addition. At the end of TDI addition, the reaction mixture was cooled to room temperature and dissolved in 200 ml CH$_2$Cl$_2$. The polymer was isolated by precipitation from hexane and dried in a vacuum oven at room temperature for at least 24 hours.

Polymer properties $M_w$=111,000 (GPC, PS, STD); $T_m$=118° C. (DSC); $T_{g1}$ (PTMO)=−21° C. (DSC); $T_{g2}$ (PLA)=45° C.(DSC); TS=7,400 psi; Initial Modulus=4,700 psi; Elongation at break=870%.

EXAMPLE 6

Synthesis of 50/50 wt. % polylactide/Polyethylene Oxide

In a dry box, 10.0 g (69.44 mmoles) L-Lactide and 10.0 g (1.25 mmoles) hydroxyl terminated polyethylene oxide (PEO) with $M_n$ of 8,000 g/mole were weighed into an oven dried 100 ml round bottom flask equipped with overhead stirrer, addition funnel and nitrogen inlet. The reaction flask was then transferred in the hood, placed under a dry nitrogen atmosphere, and heated in an oil bath to 120° C., using a programmable hot plate. The homogeneous melt was reacted for one hour at 120° C., in the absence of catalyst, to allow initiation of polymerization at the hydroxyl endgroups of PEO oligomer. After one hour, the reaction temperature was increased to 150° C., 0.35 ml SnOct solution (0.1M in toluene) were added (M/Cat=2000/1 molar ratio), and the reaction was allowed to proceed for 2 more hours at 150° C. A viscous homogeneous melt was formed shortly after catalyst addition, and the viscosity increased with reaction time. 5 Ml toluene and 0.19 ml (1.312 mmoles, 5% excess) TDI were syringed into the addition funnel, and the TDI solution was added drop-wise into the reaction mixture, over 30 minutes. During TDI addition, the reaction viscosity increased considerably but stayed clear all the way through addition. At the end of TDI addition, the reaction mixture was cooled to room temperature and dissolved in 200 ml CH$_2$Cl$_2$. The polymer was isolated by precipitation from hexane, and dried in a vacuum oven at room temperature for at least 24 hours.

Polymer properties $M_w$=111,000 (GPC, PS STD); Multiple $T_m$s in DSC; $T_{g1}$ (PTMO)=−57° C. (DSC); $T_{g2}$ (PLA)=37° C. (DSC); TS=1,100 psi; Initial Modulus=14,4000 psi; Elongation at break=611%.

EXAMPLE 7

Synthesis of 75/25 wt. % Polylactide/Polyethylene Oxide

A 100 ml flask is charged with 5.0 g (1.47 mmole) polyethylene oxide having a number average molecular weight of 3,400, 15.0 g (104.16 mmoles) L-lactide and 0.26 ml of a 0.1M solution of tin 2-ethylhexanoate in toluene (monomer/catalyst 2000/1). The flask is heated to and maintained at 150° C. After 2 hours at 150° C., 0.27 g (1.544 mole) of toluene diisocyanate in 5 ml toluene is added dropwise to the flask. After 30 minutes the temperature of the flask is dropped to 25° C. and the product polymer is dissolved in 200 ml $CH_2Cl_2$ and recovered by precipitation from hexane. The product polymer is a toughened plastic having a weight average molecular weight of 98,000, a wt % ratio of A/B of 75/25, a glass transition temperature of 20° C., a melting point of 148° C., an initial modulus of elasticity of 38,000 psi, a tensile strength at maximum of 2,500 psi, and an elongation at break of 470%.

EXAMPLE 8

Synthesis of 75/25 wt. % Polylactide/Polycaprolactone Copolymer

A 100 ml glass flask is charged with 5.0 g (2.5 mmole) polycaprolactone having a number average molecular weight of 2,000, 15.0 g (104.26 mmoles) L-lactide, and 0.26 ml of a 0.1M solution of tin 2-ethylhexanoate in toluene (monomer/catalyst 2000/1). The flask is heated to and maintained at 150° C. After 2 hours at 150° C. 0.46 g toluene diisocyanate is added to the flask. After 30 minutes the flask is cooled to 25° C. and the product polymer dissolved in 200 ml $CH_2CCl_2$ and recovered by precipitation from hexane. The product polymer is a toughened plastic having a number average molecular weight of 98,000, a wt. % ratio of A/B of 75/25, a glass transition temperature of 30° C., a melting point of 140° C., an initial modulus of elasticity of 40,000 psi, a tensile strength at maximum of 5,540, and elongation at break of 685%.

EXAMPLE 9

Synthesis of 50/50 wt. % Polyactide/Polycaprolactone

A 100 ml glass flask is charged with 10.0 g (5.0 mmole) of polycaprolactone having a number average molecular weight of 2,000, 10.0 g (69.44 mmole) of L-lactide, and 0.35 ml of a 0.1M solution of tin 2-ethythexanoate in toluene (monomer/catalyst=2000/1). The flask is heated to and maintained at 150° C. After 2 hours at 150° C., 0.91 g (5.25 mmole) of toluene diisocyanate is added to the flask. After 30 minutes the flask is cooled to 25° C., and the product polymer dissolved in 200 ml $CH_2Cl_2$, and recovered by precipitation from hexane. The product polymer is a thermoplastic elastomer having a number average molecular weight of 72,500, a wt. % ratio of A/B of 50/50, a glass transition temperature of $-14°$ C., a melting point of 56° C./90° C. an initial modulus of elasticity of 2,000 psi, a tensile strength at maximum of 440 psi, and an elongation at break of 990%.

EXAMPLE 10

Synthesis of 50/50 wt. % Polylactide/Polyethylene Oxide Copolymer

A 100 ml glass flask is charged with 10.0 g (2.94 mmole) of polyethylene oxide having a number average molecular weight of 3,400, 10.0 g (69.44 mmole) of L-lactide, and 0.35 ml of a 0.1M solution of tin 2-ethylhexanoate in toluene (monomer/catalyst=2000/1). The flask is heated to and maintained at 150° C. After 2 hours at 150° C., 0.54 g (3.1 mmole) toluene diisocyanate is added to the flask. After 30 minutes the flask is cooled to 25° C., and the product polymer dissolved in 200 ml $CH_2Cl_2$ and recovered by precipitation from hexane. The product polymer is a thermoplastic elastomer having an average molecular weight of, a wt. % ratio of A/B of 50/50, two glass transition temperatures of $-36°$ C. and 43° C., a melting point of 82° C., an initial modulus of elasticity of 480 psi, and an elongation at break of 410%.

Having thus described and exemplified the invention with a certain degree of particularity, it should be appreciated that the following claims are not to be so limited but are to be afforded a scope commensurate with the wording of each element of the claim and equivalents thereof.

I claim:

1. A block copolymer of the formula R—A—B—A—L)$_x$A—B—A—R where -B- is an oligomeric diol residue or an oligomeric diamine residue having a having a number average molecular weight of 500 to 20,000, -A- is a polylhydroxy acid block comprising either a polylactide, polyglycolide, or copolymer thereof having a number average molecular weight 500 to 40,000, x is 1 to 100, and -L- is a diacyl residue derived from an aromatic diacyl halide or diisocyanate containing 8 to 20 carbon atoms, and -R is hydrogen or an end-capping group, wherein said block copolymer has a number average molecular weight of greater than 10,000.

2. The block copolymer of claim 1 wherein -B- is a dioxyterminated oligomeric diol residue having repeating units selected from the group consisting of:

(i) a structure corresponding to

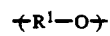

where -R$^1$- is —CH$_2$)$_z$ where z is 2 to 6;

(ii) a structure corresponding to

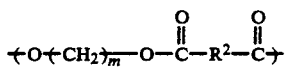

where m is 2 to 6 and -R$^2$- is a divalent, aliphatic, cycloaliphatic or aromatic group having 2 to 20 carbon atoms;

(iii) a structure corresponding to

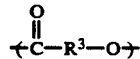

where -R$^3$- is a divalent aliphatic; cycloaliphatic or aromatic group having 6 to 20 carbon atoms; and (iv) a structure corresponding to

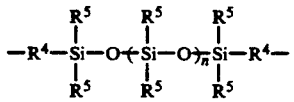

where the -R$^4$s are alkylene groups containing 3 to 10 carbon atoms, with a terminal hydroxy function, the -R$^5$s are independently selected from the group consisting of hydrogen, saturated or unsaturated aliphatic radicals containing 1 to 20 carbon atoms, aromatic radicals containing 6 to 20 carbon atoms, and perfluoroalkyl radicals containing 1 to 20 carbon atoms and n is 15 to 150.

3. The block copolymer of claim 2 wherein the -B- residue has a number average molecular weight of 2,000 to 8,000.

4. The block copolymer of claim 3 wherein the -A- block has number average molecular weight of 2,000 to 20,000.

5. The block copolymer of claim 4 wherein -A- is a polylactide block formed of at least 98% of either L-lactide or D-lactide.

6. The block copolymer of claim 5 wherein -B- is formed of repeating units of the structure —R$^1$—O).

7. The block copolymer of claim 6 wherein -R$^1$- is —CH$_2$CH$_2$—.

8. The process of claim 6 wherein -R$^1$- is —CH$_2$CH$_2$CH$_2$CH$_2$—.

9. The block copolymer of claim 5 where -B- is formed of repeating units of the structure

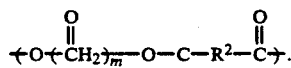

10. The block copolymer of claim 9 wherein -B- is poly(butylene-ethylene adipate).

11. The block copolymer of claim 5 wherein -B- is formed of repeating units of the structure

12. The block copolymer of claim 11 wherein -B- is polycaprolactone.

13. A process for preparing a block copolymer comprising reacting an oligomeric diol or oligomeric diamine, H-B-H, having a number average molecular weight of 500 to 20,000 with a lactone of a hydroxycarboxylic acid of the formula:

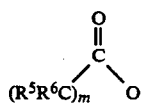

where R$^5$ and R$^6$ are H, aliphatic group of 1 to 10 carbon atoms or aromatic groups of 6 to 12 carbon atoms and m is 2 to 10, or

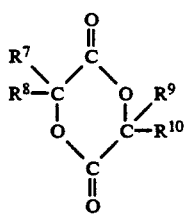

where -R$^7$, -R$^8$, -R$^9$, and -R$^{10}$ are the same or different and are an aliphatic group of 1 to 10 carbon atoms or an aromatic group of 6 to 12 carbon atoms, to form a polymer H-A-B-A-H where the -A- blocks have a number average molecular weight of 500 to 40,000, reacting polymer H-A-B-A-H with an diisocyanate or diacyl halide containing 8 to 20 carbon atoms, to form a polymer of the formula R—A—B—A—L)$_x$A—B—A—R having a number average molecular weight of 500 to 20,000 where -L- is the residue from the diisocyanate or diacyl halide and -R is hydrogen, a residue from an diacyl halide or diisocyanate or an end-capping agent.

14. The process of claim 13 wherein -B- is
(i) a polyether residue formed of repeating units of the structure —R$^1$—O— where -R$^1$- is —CH$_2$)$_z$ where z is 2 to 6,
(ii) a polyester formed of repeating units of the structure

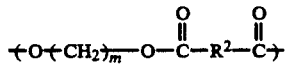

where m is 2 to 6 and -R$^2$- is a divalent aliphatic, cycloaliphatic or aromatic group having 2 to 20 carbon atoms,
(iii) a polyester residue formed of repeating units of the structure

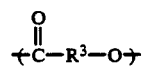

where -R$^3$- is a divalent aliphatic, cycloaliphatic or aromatic group having 6 to 20 carbon atoms; or
(iv) a poly(organosiloxane) residue formed of repeating units of the structure

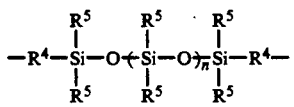

where the -R$^4$s are alkylene groups containing 3 to 10 carbon atoms, with a terminal amino or hydroxy function, the -R$^5$s are independently selected from the group consisting of hydrogen, saturated or unsaturated aliphatic radicals containing 1 to 20 carbon atoms, aromatic radicals containing 6 to 20 carbon atoms, and perfluoroalkyl radicals containing 1 to 20 carbon atoms and n is 15 to 150.

15. The process of claim 14 wherein the -B- units have number average molecular weights of 2,000 to 8,000.

16. The process of claim 15 wherein the lactone is polymerized to form -A- units having number average molecular weights of 2,000 to 20,000.

17. The process of claim 16 wherein the lactone is lactide.

18. The process of claim 17 wherein the lactide is at least 98% L-lactide or at least 98% D-lactide.

19. The process of claim 18 wherein -B- is formed of repeating units of the structure —R$^1$—O).

20. The process of claim 19 wherein -R$^1$- is —CH$_2$CH$_2$—.

21. The process of claim 19 wherein -R$^1$- is —CH$_2$CH$_2$CH$_2$CH$_2$—.

22. The process of claim 17 wherein -B- is formed of repeating units of the structure

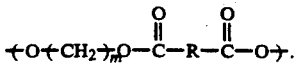

23. The process of claim 22 wherein -B- is poly(butylene-ethylene adipate).

24. The process of claim 18 wherein -B- is formed of repeating units of the structure
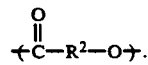
25. The process of claim 23 wherein -B- is polycaprolactone.
* * * * *